Feb. 22, 1938.  C. G. BIRO  2,109,161
SAW SETTING MACHINE
Filed May 21, 1937   2 Sheets-Sheet 1
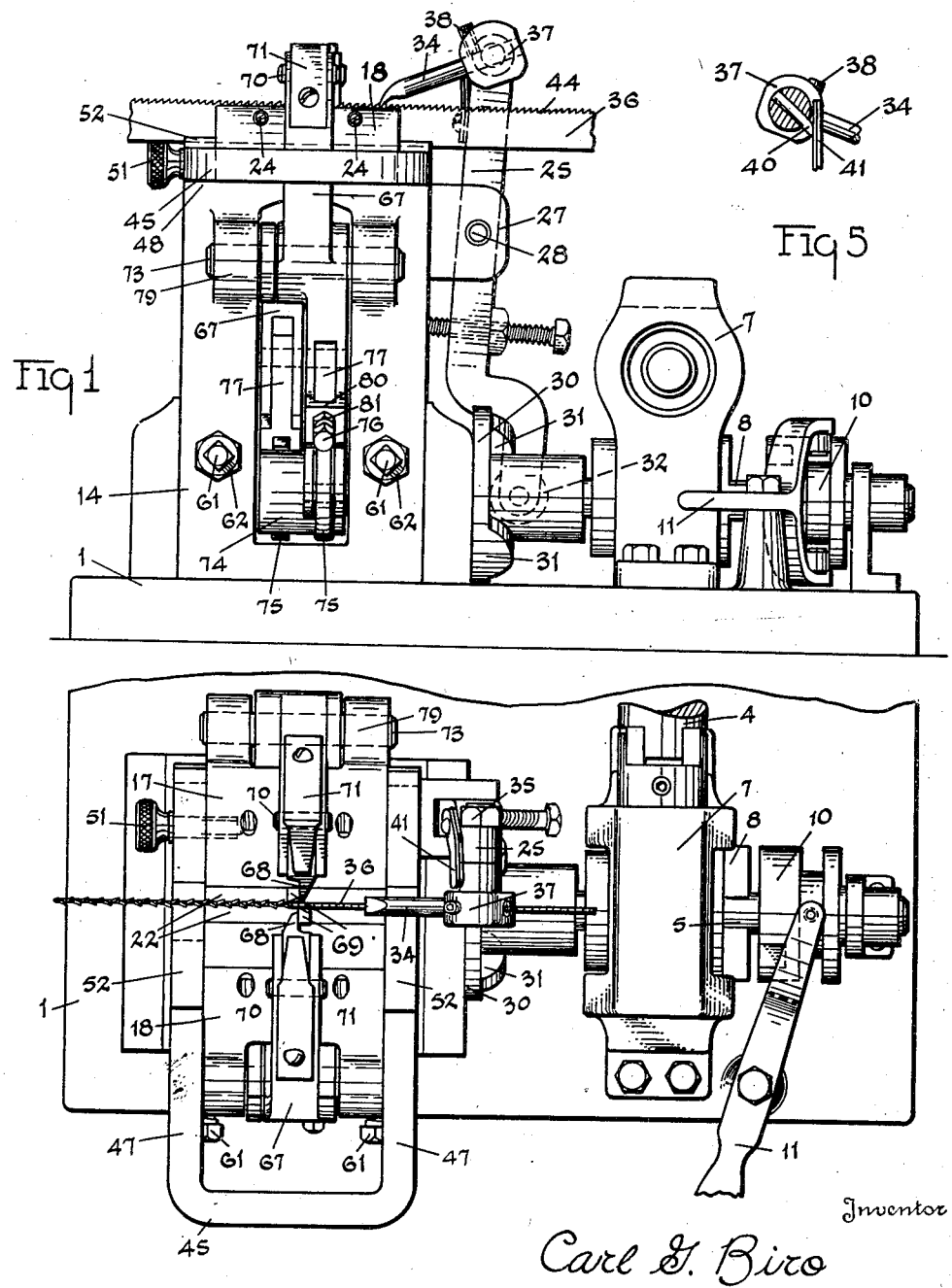
Inventor
Carl G. Biro
By Faust & Crampton
Attorney Feb. 22, 1938.  C. G. BIRO  2,109,161
SAW SETTING MACHINE
Filed May 21, 1937  2 Sheets-Sheet 2

Inventor
Carl G. Biro
By Faust F. Crampton
Attorney

Patented Feb. 22, 1938

2,109,161

UNITED STATES PATENT OFFICE 2,109,161

SAW SETTING MACHINE

Carl G. Biro, Marblehead, Ohio

Application May 21, 1937, Serial No. 144,026

1 Claim. (Cl. 76—61)

My invention has for its object to provide a saw setting machine in which the teeth of the saw may be rapidly bent with reference to the surfaces of the body of the blade and angularly positioned to form cutting clearance on the following sides of the lateral surfaces of the teeth that greatly reduces cutting friction.

The invention particularly provides a machine having a clamping means that accurately clamps the body of the blade of the saw in adjustable relation to the teeth, and fingers having surfaces that conform to the lateral surfaces of the teeth when set in their angular relation to the clamping surfaces of the clamping means by which the lateral surfaces of contiguous teeth are forced into the desired angular relation with reference to the lateral surfaces of the body of the blade while retaining the lateral surfaces of the teeth plane.

The invention may be contained in machines of different forms and the structures may be varied in their details and still embody the invention. To illustrate a practical application of the invention, I have selected a saw setting machine as an example of the various structures that contain the invention, and shall describe the selected structure hereinafter. The particular structure selected is shown in the accompanying drawings.

Figure 3:
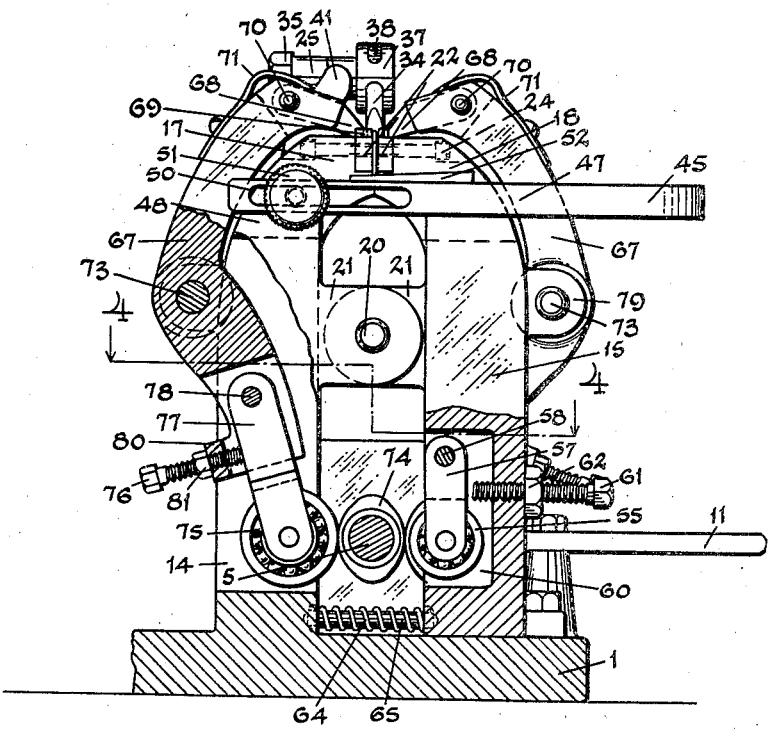
Figure 4:
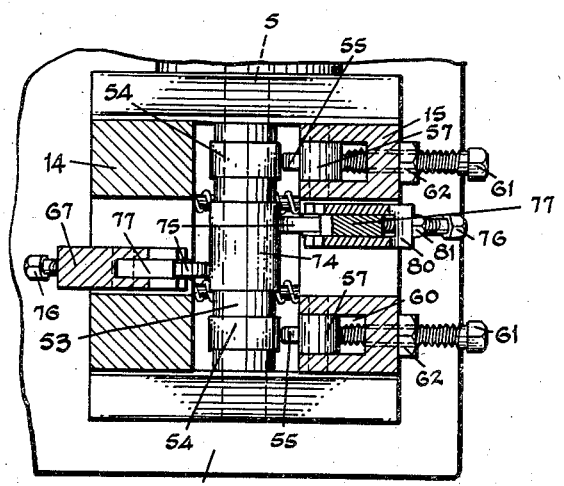

Fig. 1 illustrates a front view of the machine, Fig. 2 illustrates a top view of the machine, Fig. 3 illustrates a side view of the machine, parts of the machine being shown broken away and sectioned to illustrate interiorly located parts, Fig. 4 illustrates a view of a section taken on the plane of the broken line 4—4 indicated in Fig. 3 and Fig. 5 illustrates a part of the step-by-step operating mechanism for moving the saw relative to the machine.

The particular machine shown in the drawings has a base 1. The machine is operated by a suitable motor that drives a shaft 4. The power of the motor is transmitted from the shaft 4 to a shaft 5 by means of suitable worm gears contained in a gear box 7. One of the gears has a clutch connector 8 and a slidable clutch 10 is keyed to the shaft 5 and when operated it connects with the clutch connector 8 to connect the shafts 4 and 5. The clutch 10 may be operated by a suitable lever 11 pivotally supported upon the base 1. The shaft 5 operates a means for clamping and releasing the saw and a means for moving the saw step by step to position the teeth of the saw relative to the setting elements of the machine and to operate the setting elements.

The machine has two upwardly extending parts 14 and 15. The part 14 may be integrally formed with the base 1, and the part 15 may be pivotally supported on the part 14. The upper ends of the parts 14 and 15 are provided with clamping jaws 17 and 18. The part 15 is pivotally connected to the part 14 by means of a pivot pin 20 that extends through ears 21 that protrude from the parts 14 and 15. The jaws 17 and 18 may be provided with hardened steel clamping blocks 22 that may be disposed on shoulders formed in the jaws 17 and 18 and secured in position by means of screws 24.

The machine is particularly designed for setting the teeth of band saws. The blade of the saw is intermittently moved between the clamping blocks 22 by means of a pivoted arm 25. The arm 25 is pivotally supported by means of a pivot pin or bolt 26 that extends through and is secured in a bifurcated lug 27 formed integrally on the upright part 14. A disc 30 having projecting cam parts 31 is connected to the shaft 5 and as the shaft rotates the cam parts 31 engage the lower end of the arm 25 and oscillate the arm. The lower end of the arm 25 is provided with a suitable roller 32 to reduce the friction between the disc 30 and the arm 25. The upper end of the arm 25 is provided with a pivotally supported dog 34. The dog 34 overhangs the saw 36, the arm 25 being disposed on one side of the saw. The dog 34 is pivotally connected to the upper end of the arm 25 by means of a suitable bolt 35 and the head 37. The dog 34 is adjustably secured in the head 37 by means of a set screw 38 whereby the dog 34 may be adjusted with reference to the teeth of the saw. The head 37 is provided with a pin 40 and a leaf spring 41 is secured to the arm 25 and operates to yieldingly press the dog 34 against the saw 36 to produce engagement of the nose of the dog 34 with the teeth 44 of the saw and move the saw step by step as the arm 25 is moved by the projecting cam parts 31. The bases of the teeth of the saw and the nose of the dogs 34 are thus moved along the upper surfaces of the clamping blocks 22.

The saw 36 may be adjustably located with reference to the upper surfaces of the clamping blocks 22 by means of a U-bar 45 having leg parts 47 disposed on shoulders 48 formed at the sides of the upper end of the part 14 of the machine. The leg parts 47 of the U-bar extend over shoulders formed also in the sides of the part 15. One of the legs 47 may be provided with a slot 50 through which a clamping screw 51 extends and is threaded into the upper end of the part 14. The screw 51 may be operated to clamp the U-bar 45 to the upper end of the part 14. The legs of the U-bar are provided with cam blocks 52 having inclined upper surfaces on which the back edge of the saw may be located and against which it is maintained by the pressure of the dog 34, the nose of the dog 34 being disposed at a point above and intermediate the upper surfaces of the cam blocks 52. As the arm 25 is oscillated the spring-pressed dog 34 moves the saw 42 between the surfaces of the cam blocks 52 and elastically presses the back edge of the saw against the surfaces of the wedges as the saw is moved step by step.

Preferably the U-bar 45 is adjustably secured by the clamping bolt 51 so as to locate the base line of the teeth 44 of the saw 42 at the upper opposed edges or corners of the clamping blocks 22 to prevent crimping of the body portion of the blade contiguous to the teeth as the teeth are bent angularly in the setting of the teeth.

The saw is shifted by the oscillatory movement of the arm 25 to move consecutive pairs of teeth along the edges or corners of the steel clamping blocks 22 when the saw is released from the clamping means upon each oscillatory movement of the arm 25 and into positions to be engaged by two setting elements. The clamping jaw 18 is operated by means of a cam member 53 having a pair of cam parts 54 that engage a pair of rollers 55 supported on pendulous arms 57 pivotally supported by pivot pins 58 and located in recesses 60 formed in the part 15. The oscillatory movements of the pendulous arms 57 by the cam 54 are limited by set screws 61 that may be adjustably secured in the wall of the recess 60 by suitable lock nuts 62. The cams 54 are located on the shaft 5 and have a pair of projecting cam parts located in diametrically opposite sides of the axis of the shaft 5 and are disposed relative to the cam parts 31 of the disc 30 to engage the rollers 55 and move the arms 57 against the end of the set screws 61 when the dog 34 has completed its movement of the consecutive pairs of teeth of the saw in position to enable the machine to set the teeth. The set screws 61 may be adjusted to produce the required timing relation to securely clamp and release the saw with reference to the operation of the dog 34 in shifting the saw.

Preferably, the steel clamping blocks 22 are normally held against the surface of the body of the saw blade with but a slight pressure and the cams 54 operate to tighten the surface of the cam blocks against the surface of the saw blade when the setting elements engage the teeth of the saw. The lower end of the pivotal clamping member 17 is spring-pressed by a spring 64 located intermediate the lower end of the part 14 of the frame 2 of the machine and the lower end of the clamping member 17. Preferably, the spring 34 surrounds a pin 65 to maintain the spring 64 in position to hold the surfaces of the clamping blocks 22 in contact with the surfaces of the saw.

The pairs of teeth thus disposed in position by the operation of the arm 25 are set by the operation of a pair of levers 67 having fingers 68. The fingers 68 are pivotally supported in recesses formed in the upper ends of the levers 67 and are pivotally connected to the ends of the levers 67 by means of pivot pins 70. They are spring-pressed by means of leaf springs 71 secured to the upper ends of the levers 67 and bent over the ends of the fingers to press the fingers toward the upper surfaces of the steel clamping blocks 22. The ends of the fingers 68 have plane surfaces that are inclined angularly 6° with respect to the opposed surfaces of the clamping blocks 22. The clamping blocks 22 have anvils 69 that have lateral surfaces that are located in opposed relation to the surfaces of the ends of the fingers 68 and likewise are located in planes that extend at an angle of 6° to the opposing or clamping surfaces of the clamping blocks 22. Thus, when the fingers engage the teeth of the saw and press them against the anvils, the lateral surfaces are bent in opposite directions to angularly dispose their edges in planes located 6° with respect to the lateral surfaces of the body of the saw in order to produce a clearance surface for each laterally protruding cutting edge.

The levers 67 are operated by a cam part 74 having projecting portions located on diametrically opposite sides of the cam member 53 and in position to engage the rollers 75 supported on pendulous arms 77 pivotally connected to the lower ends of the levers 67 by means of pivot pins 78. The springs 71 that press the fingers 68 against the upper surfaces of the steel clamping blocks 22, also operate to press the rollers 75 against the cam 74 upon proper adjustment of the screws 76 when the high parts of the cam are moved from the rollers 75. The levers 67 are pivotally supported by the pins intermediate the bifurcated ears 79 located on the parts 14 and 15 of the machine. The lower ends of the levers 67 are bifurcated and the arms 77 are located in the bifurcated ends of the levers 67. The lower ends of the levers 67 are provided with screws 76 that extend through bridge parts 80 and are adjustably secured in position with reference to the arms 77 by means of the lock nuts 81 by which the rollers 75 may be adjustably located with reference to the projecting parts of the cam 68 to produce a timed movement of the levers 67 with reference to the operation of the clamping jaw 18 to cause the levers 67 to operate the fingers 68 to set consecutive pairs of the teeth placed in position relative to the fingers 68 by the dog 34 operated by the arm 25.

I claim:

In a saw setting machine, a frame having a fixed part for engaging a lateral surface of the saw, a clamping member pivotally supported on the fixed part for engaging the other lateral surface of the saw and clamping the saw against the fixed part, a pair of rollers, a pair of depending arms pivotally connected to the clamping member for rotatably supporting the rollers, means for intermittently moving consecutive pairs of teeth relative to the clamping member and the fixed part, a U-bar slidably supported on the frame of the machine and enclosing the fixed part and the clamping member and slidably movable along the end surfaces of the fixed part and the clamping member and having sloping surface parts for engaging the back of the saw, means for adjustably securing the sliding bar in position for adjustably positioning the saw relative to the fixed part and the clamping member, a pair of saw setting levers having finger parts for engaging consecutive pairs of teeth operative to bend the teeth laterally along the line of their bases in opposite directions, a pair of anvils for engaging and cooperating with the end parts of the fingers to shape the teeth, the opposing surfaces of the anvils and the fingers having like inclined surfaces, a pair of rollers, a pair of pivoted arms for supporting the last-named rollers on the said levers, a cam member for operating the said rollers, and adjustable stops located on the clamping member and the levers for engaging the said arms to produce timed relation between the clamping of the saw and the operation of the said fingers.

CARL G. BIRO.